United States Patent
Fukuyama et al.

(10) Patent No.: US 12,091,576 B2
(45) Date of Patent: Sep. 17, 2024

(54) RESIN COMPOSITION FOR POWDER COATINGS

(71) Applicant: ARKEMA FRANCE, Colombes (FR)

(72) Inventors: Takehiro Fukuyama, Chiyoda-ku (JP); Mathieu Capelot, Serquigny (FR); Samuel Devisme, Serquigny (FR); Antoni Nogues, Sant Celoni (ES); Lluis Casadevall, Sant Celoni (ES)

(73) Assignee: ARKEMA FRANCE, Colombes (FR)

( * ) Notice: Subject to any disclaimer, the term of this patent is extended or adjusted under 35 U.S.C. 154(b) by 609 days.

(21) Appl. No.: 17/309,761

(22) PCT Filed: Dec. 20, 2019

(86) PCT No.: PCT/EP2019/086626
§ 371 (c)(1),
(2) Date: Jun. 17, 2021

(87) PCT Pub. No.: WO2020/127938
PCT Pub. Date: Jun. 5, 2020

(65) Prior Publication Data
US 2022/0056279 A1   Feb. 24, 2022

(30) Foreign Application Priority Data
Dec. 21, 2018 (EP) .................................... 18306835

(51) Int. Cl.
*C09D 5/03* (2006.01)
*C09D 127/16* (2006.01)
*C09D 167/02* (2006.01)

(52) U.S. Cl.
CPC ............. *C09D 5/031* (2013.01); *C09D 5/033* (2013.01); *C09D 127/16* (2013.01); *C09D 167/02* (2013.01)

(58) Field of Classification Search
CPC ...... C09D 5/031; C09D 5/033; C09D 127/16; C09D 167/02
See application file for complete search history.

(56) References Cited

U.S. PATENT DOCUMENTS

| 8,853,320 | B2 | 10/2014 | Wei et al. |
| 2005/0124779 | A1 | 6/2005 | Shelby et al. |
| 2015/0072151 | A1 | 3/2015 | Saito et al. |

FOREIGN PATENT DOCUMENTS

| CN | 106634479 | 5/2017 |
| EP | 0416501 | 3/1991 |
| EP | 3165581 | 4/2020 |
| WO | WO 99/60066 | 11/1999 |
| WO | WO 01/181470 | 11/2001 |
| WO | WO 2014/002964 A1 | 1/2014 |
| WO | WO 2017/144088 A1 | 8/2017 |

OTHER PUBLICATIONS

International Search Report and Written Opinion of PCT/EP2019/086626, Dated Feb. 6, 2020, in 8 pages.

*Primary Examiner* — Ling Siu Choi
*Assistant Examiner* — Andrea Wu
(74) *Attorney, Agent, or Firm* — Knobbe, Martens, Olson & Bear, LLP

(57) ABSTRACT

The invention relates to a resin composition comprising a blend of: a) 10 to 90% by weight of at least one fluoropolymer resin and b) 90 to 10% by weight of at least one semi-crystalline polyester resin, based on the total weight of the fluoropolymer resin and semi-crystalline polymer resin. The invention also relates to a method for producing such resin composition, to a powder coating composition comprising such resin composition and to the use of such resin composition, in particular for architectural powder coating.

20 Claims, No Drawings

RESIN COMPOSITION FOR POWDER COATINGS

TECHNICAL FIELD

The present invention relates to new resin compositions based on fluoropolymer and semi-crystalline polyester resins, useful for powder coatings, and to methods for producing such compositions.

TECHNICAL BACKGROUND

Due to increasing concerns in environmental pollution, the coating industry is shifting towards no volatile organic compounds (VOC).

Powder coating is an environmentally promising technology since it does not contain any VOC and does not require exhaust treatment or waste water treatment. In addition, excess material can be reclaimed.

Powder coatings based on acrylic, polyester, and epoxy resins are historically used but they exhibit poor weathering properties.

On the other hand, coatings based on fluoropolymer are weatherable. However, fluoropolymers are difficult to grind to powder and coating materials comprising fluorinated resins generally contains water or solvents and are not in the form of powder.

To face the abovementioned issues, attempts to develop powder coatings containing fluoropolymer and another resin have been made.

Document EP 3 165 581 describes a composition for powder coating material comprising polyvinylidene fluoride and an acrylic resin, as well as a powder coating material comprising a first powder composed of said composition and a second powder composed of an acrylic resin, a polyester resin, a urethane resin, an epoxy resin or a silicone resin.

Document US 2015/0072151 describes a powder coating composition comprising a fluorinated resin and a polyester polymer, the polyester polymer comprising units derived from a $C_{8-15}$ aromatic polybasic carboxylic acid compound and units derived from a $C_{2-10}$ polyhydric alcohol compound.

Most of the available polyesters are amorphous polyesters. However, such amorphous polyester resins are not compatible with fluoropolymer resins, which results in a heterogeneous blend when these two resins are mixed. This incompatibility limits the amount of fluoropolymer resin which can be brought into the resin blend, leading to a coating having reduced quality and weathering properties.

In addition, it is important that the coating exhibits a good resistance to solvents since it may be cleaned with various chemicals during use.

There is thus a need for a resin composition which makes it possible to produce coatings with good weathering properties and good solvent resistance, and which is cost-effective and can be easily powdered.

SUMMARY OF THE INVENTION

It is a first object of the invention to provide a resin composition comprising a blend of:
  a) 10 to 90% by weight of at least one fluoropolymer resin and
  b) 90 to 10% by weight of at least one semi-crystalline polyester resin, based on the total weight of the fluoropolymer resin and semi-crystalline polymer resin;

wherein said semi-crystalline polyester resin preferably has a linear aliphatic or/and cycloaliphatic structure.

In some embodiments, the semi-crystalline polyester comprises, and preferably consists of, units derived from:
  at least a poly-carboxylic acid chosen among a linear aliphatic dicarboxylic acid and/or a cycloaliphatic dicarboxylic acid, and
  at least a polyol chosen among a linear aliphatic diol and/or a cycloaliphatic diol.

In some embodiments, the poly-carboxylic acid is chosen among a linear aliphatic $C_4$-$C_8$ dicarboxylic acid, preferably a linear aliphatic $C_4$-$C_6$ dicarboxylic acid, and/or a cycloaliphatic dicarboxylic acid, and is more preferably chosen among adipic acid, acid, succinic 1,5-pentanedioic acid, 1,4-cyclohexanedicarboxylic acid and a combination thereof; and the polyol is chosen among a linear aliphatic $C_2$-$C_8$ diol, preferably a linear aliphatic $C_2$-$C_6$ diol, more preferably a linear aliphatic $C_4$-$C_6$ diol, and/or a cycloaliphatic diol, and is more preferably chosen among 1,6-hexanediol, 1,4-butanediol, 1,4-cyclohexanedimethanol and a combination thereof.

In some embodiments, the melting temperature of the semi-crystalline polyester resin is from 75° to 150° C., preferably from 90 to 130° C.

In some embodiments, the glass transition temperature of the semi-crystalline polyester resin is lower than 55° C., preferably from −20 to 50° C., more preferably from −15 to 40° C., as determined by DSC at a heating rate of 10° C./min.

In some embodiments, the semi-crystalline polyester resin has a hydroxyl value of from 15 to 70 mg KOH/g, preferably from 20 to 40 mg KOH/g and an acid value lower than 10 mg KOH/g, preferably lower than 5 mg KOH/g.

In some embodiments, the number average molecular weight Mn of the semi-crystalline polyester is from 1500 to 15000, preferably from 2000 to 5000.

In some embodiments, the semi-crystalline polyester resin has a heat of fusion of from 20 to 100 J/g, preferably from 25 to 90 J/g, as determined by DSC at a heating rate of 10° C./min.

In some embodiments, the semi-crystalline polyester resin has a melt viscosity of from 0.005 to 10 Pa·s at 165° C. and at a shear rate of 30 $s^{-1}$.

In some embodiments, the resin composition comprises from 60 to 90% by weight of said fluoropolymer resin a) and from 10 to 40% by weight of said semi-crystalline polyester resin b), based on the total weight of the fluoropolymer resin and semi-crystalline polymer resin.

In some embodiments, the fluoropolymer resin is chosen among polyvinylidene fluoride homopolymers and poly(vinylidene fluoride-hexafluoropropylene) copolymers.

In some embodiments, the fluoropolymer resin has a melting temperature higher than that of the semi-crystalline polyester resin.

In some embodiments, the resin composition is in the form of flakes or pellets.

In some embodiments, the resin composition is in the form of a powder.

In some embodiments, the resin composition has a particle volume median diameter Dv50 of from 10 to 250 μm, preferably from 30 to 150 μm, as determined by laser granulometry.

It is another object of the invention to provide a method for producing the resin composition as described above, comprising:
  blending in a blender, preferably in an extruder, the fluoropolymer resin a) with the semi-crystalline polyester resin b), at temperature higher than the melting point of the semi-crystalline polyester resin, the semi-crystalline polyester resin being in the molten state, to form a blend.

In some embodiments, the method comprises a further step of:

converting the blend into flakes, into pellets or into a powder after cooling.

In some embodiments, the fluoropolymer resin remains in the solid state without melting during the step of blending.

It is another object of the invention to provide a powder coating composition, comprising at least one resin composition as defined above or obtained by the method as described above.

In some embodiments, the powder coating composition further comprises a crosslinking agent and, optionally, other additives chosen among pigments, flow agents, degassing agents, waxes and combinations thereof.

It is another object of the invention to provide a use of the resin composition as described above, in a powder coating composition, preferably a crosslinkable powder coating composition.

In some embodiments, the use is for architectural powder coating.

It is another object of the invention to provide a powder coating obtained by applying and optionally curing the powder coating composition as described above.

The present invention enables to meet the abovementioned need. In particular, the invention provides a cost-effective, stable and homogeneous resin composition, which is easily ground to powder and which can lead to a coating having one or preferably several of the following advantageous features: good weathering properties, good adhesion properties, high performance durability, good solvent resistance, excellent overall appearance. The resin composition of the invention may be ground using the usual powder coating manufacturing processes and may be used in exterior coating applications.

This is achieved by the use of a blend of a fluoropolymer resin with a polyester resin, the polyester resin being a semi-crystalline polyester resin. The use of a semi-crystalline polyester resin, and in particular of linear aliphatic and/or cycloaliphatic structure, makes it possible to improve the compatibility between the fluoropolymer resin and the polyester resin. Moreover, the addition of a polyester resin into the fluoropolymer resin makes it possible to improve the grinding ability compared to a fluoropolymer resin alone.

DETAILED DESCRIPTION

The invention will now be described in more detail without limitation in the following description.

Unless otherwise mentioned, the percentages in the present application are percentages by weight.

Resin Composition

In a first aspect, the invention relates to a resin composition comprising a blend of:
a) at least one fluoropolymer resin, and
b) at least one semi-crystalline polyester resin.

By "semi-crystalline" is meant non-amorphous. The phase changes establishing whether a resin is semi-crystalline or amorphous can be detected by Differential Scanning calorimetry (DSC), as described in the Encyclopedia of Polymer Science and Engineering, Volume 4, pages 482-519, 1986 (Wiley Interscience). A resin is considered to be amorphous if it does not show a discernible crystallization or melting peak. A resin is considered to be semi-crystalline if it shows at least one crystallization or melting peak. In general, when different melting peaks are observed in a DSC curve, these multiple peaks are specified by a melting range. It should be noted that the term "semi-crystalline" as defined herein encompasses strictly semi-crystalline polymers (i.e. polymers showing a discernible glass transition temperature Tg) as well as crystalline polymers (i.e. polymers showing no discernible glass transition temperature Tg).

Semi-crystalline (or crystalline) polyester resins differ from conventional amorphous polyester resins as used in powder coatings in that they have a heterogeneous morphology (i.e. they contain a mixture of phases), are usually opaque and white in color at room temperature and, in addition to their relatively low melt viscosities, are much more insoluble in common organic solvents, for example xylene, white spirit and ketones, than their amorphous counterparts. Semi-crystalline polyester resins generally have a high degree of structural regularity (i.e. chemical, geometrical and/or spatial symmetry).

The resin composition of the invention comprises a blend of:
a) 10 to 90% by weight of the at least one fluoropolymer resin, and
b) 90 to 10% by weight of the at least one semi-crystalline polyester resin, based on the total weight of the fluoropolymer resin and semi-crystalline polymer resin.

Preferably, the fluoropolymer resin is present in the blend in an amount of 60 to 90% by weight, more preferably of 70 to 80% by weight, based on the total weight of the fluoropolymer resin and semi-crystalline polymer resin.

Preferably, the semi-crystalline polyester resin is present in the blend in an amount of 10 to 40% by weight, more preferably of 20 to 30% by weight, based on the total weight of the fluoropolymer resin and semi-crystalline polymer resin.

The resin composition according to the invention may be in the form of flakes or pellets. Such flakes or pellets of resin composition constitute an intermediate product, which is intended to be ground into powder.

Alternatively, the resin composition may be in the form of a powder (in this case, it is also called "powder resin composition").

In the powder resin composition of the invention, the fluoropolymer resin and the semi-crystalline polyester resin form a blend, i.e. the powder resin composition of the invention comprises particles comprising fluoropolymer and semi-crystalline polyester resins. As such, it is different from a powder composition resulting from a mixture of a powder of fluoropolymer resin with a powder of a semi-crystalline polyester resin.

Preferably, the particles of the powder resin composition have a volume median diameter Dv50 of from 10 to 250 µm, preferably from 30 to 150 µm, for example from 10 to 30 µm, or from 30 to 50 µm, or from 50 to 100 µm, or from 100 to 150 µm, or from 150 to 200 µm, or from 200 to 250 µm.

The Dv50 is the particle size at the $50^{th}$ percentile (in volume) of the cumulative size distribution of particles. This parameter may be determined by laser granulometry.

In some embodiments, the resin composition essentially consists of, or consists of, the at least one fluoropolymer resin and the at least one semi-crystalline polyester resin.

Semi-Crystalline Polyester Resin

The semi-crystalline polyester resin is preferably a linear semi-crystalline polyester resin.

The semi-crystalline polyester resin may be based on the polycondensation reaction of (cyclo)aliphatic and/or aromatic polyols with (cyclo)aliphatic and/or aromatic polycarboxylic acids or anhydrides, esters or acid chlorides based on these acids. Examples of suitable polyols include 1,2-ethanediol, 1,3-propanediol, 1,4-butanediol, diethylene glycol, 1,6-hexanediol, neopentyl glycol, 1,10-decanediol, 1-4-cyclohexanedimethanol, trimethylolpropane, 2-methylpropan-1,3-diol, hydrogenated bisphenol A (or 2,2-(dicyclohexanol) propane), 2,2,4-trimethyl-1,3-pentanediol, 2-n-butyl-2-ethyl-1,3-propanediol and 3-hydroxy-2,2-dimethylpropyl 3-hydroxy-2,2-dimethylpropanoate (CA, Reg. No.=115-20-4). Suitable poly-carboxylic acids which may be used include linear, (cyclo)aliphatic poly-carboxylic acids with 2 to 22 methylene groups and/or aromatic poly-carboxylic acids, and in particular include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and naphthalene dicarboxylic acid.

However, preferably, the semi-crystalline polyester resin has a linear aliphatic and/or cycloaliphatic structure. In particular, the semi-crystalline polyester resin may comprise units derived from:
  at least a poly-carboxylic acid chosen among a linear aliphatic dicarboxylic acid and/or a cycloaliphatic dicarboxylic acid, and
  at least a polyol chosen among a linear aliphatic diol and/or a cycloaliphatic diol.

Preferably, the semi-crystalline polyester resin does not comprise any unit derived from an aromatic poly-carboxylic acid (such as from an aromatic dicarboxylic acid) and/or from an aromatic polyol.

The semi-crystalline polyester resin may essentially consist, or consist, of units derived from:
  at least a poly-carboxylic acid chosen among a linear aliphatic dicarboxylic acid and/or a cycloaliphatic dicarboxylic acid, and
  at least a polyol chosen among a linear aliphatic diol and/or a cycloaliphatic diol.

Advantageously, the linear aliphatic dicarboxylic acid is a linear aliphatic $C_4$-$C_8$ dicarboxylic acid, and more preferably a linear aliphatic $C_4$-$C_6$ dicarboxylic acid. For example, it may be a linear aliphatic $C_4$ dicarboxylic acid, a linear aliphatic $C_5$ dicarboxylic acid, a linear aliphatic Ce dicarboxylic acid, a linear aliphatic $C_7$ dicarboxylic acid and/or a linear aliphatic $C_8$ dicarboxylic acid.

Advantageously, the cycloaliphatic dicarboxylic acid is a $C_6$-$C_8$ cycloaliphatic dicarboxylic acid.

Preferably, the poly-carboxylic acid is chosen among adipic acid, succinic acid, 1,5-pentanedioic acid, 1,4-cyclohexanedicarboxylic acid and a combination thereof.

Preferably, the linear aliphatic diol is a linear aliphatic $C_2$-$C_8$ diol, more preferably a linear aliphatic $C_2$-$C_6$ diol and even more preferably a linear aliphatic $C_4$-$C_6$ diol. The linear aliphatic diol may be a linear aliphatic $C_2$ diol, a linear aliphatic $C_3$ diol, a linear aliphatic $C_4$ diol, a linear aliphatic $C_5$ diol, a linear aliphatic $C_6$ diol, a linear aliphatic $C_7$ diol and/or a linear aliphatic $C_8$ diol.

Advantageously, the cycloaliphatic diol may be a $C_6$-$C_8$ cycloaliphatic diol.

In preferred embodiments, the polyol is chosen among 1,6-hexanediol, 1,4-butanediol, 1,4-cyclohexanedimethanol and a combination thereof.

In particularly preferred embodiments, the semi-crystalline polyester resin is chosen among polybutylene succinate, polybutylene 1,4 cyclohexane dicarboxylate and 1,4 cyclohexane dimethanol pentadionate.

For the formation of a polyester resin with significant crystallinity, it is preferred but not essential that the polycarboxylic acids and polyols used in the polycondensation reaction contain an even number of carbon atoms. The use of aliphatic cyclic reagents symmetrically substituted, for example 1,4-cyclohexanedicarboxylic acid or 1,4-cyclohexanedimethanol, tends to promote crystallinity. However, such reagents may tend to produce semi-crystalline polyester resins having a melting temperature higher than the usual curing temperature of thermosetting polyester powder coatings; it may be preferred to use them in conjunction with a diol of the formula $HO(CH_2)_nOH$ or a dicarboxylic acid of the formula $HOOC(CH_2)_nCOOH$ where n is an even number, preferably from 2 to 8, for example 4 or 6, to produce a semi-crystalline polyester resin having a lower melting temperature.

This does not, however, preclude the use in the polycondensation reaction of monomeric poly-carboxylic acids or polyols containing an odd number of carbon atoms or the use of certain experimental techniques known to promote crystallinity in polymers, e.g. maintaining the polyester product at a temperature mid-way between its glass transition temperature (Tg) and its melting temperature (Tm) for a period of time or conducting the synthesis in (or treating the final polyester resin with) a high boiling organic solvent such as 1,3-dichlorobenzene or diphenylether so that the polyester is maintained above its Tm for a period of time before being allowed to cool to ambient temperature. These and other techniques for promoting crystallinity in carboxylic acid group-containing polyester resins may be used alone or in combination.

The semi-crystalline polyester resin may be a mixture of two or more of the abovementioned resins.

The semi-crystalline polyester resin may have a melting temperature of from 75° C. to 150° C., preferably of from 90 to 130° C., for example it may have a melting temperature of from 75 to 90° C., or from 90 to 100° C., or from 100 to 110° C., or from 110 to 120° C., or from 120 to 130° C., or from 130° C. to 150° C. The melting temperature may be measured according to ISO 11357-3:1999 Plastics-Differential scanning calorimetry (DSC) Part 3 but at a heating rate of 10° C./min.

The glass transition temperature Tg of the semi-crystalline polyester resin is preferably lower than 55° C., and may be from –20 to 50° C., more preferably from –15 to 40° C. In some embodiments, the semi-crystalline polyester resin has a glass transition temperature of from –20 to –10° C., or from –10 to 0° C., or from 0 to 10° C., or from 10 to 20° C., or from 20 to 30° C., or from 30 to 40° C., or from 40 to 50° C., or from 50 to 55° C. The glass transition temperature may be measured according to ISO 11357-2 Plastics-Differential scanning calorimetry (DSC) Part 2 but at a heating rate of 10° C./min. Examined by DSC, the semi-crystalline polyester resin may exhibit two glass transitions, one of which is attributable to a freely mobile, amorphous region in the polyester resin and the other to an amorphous region where motion is constrained by adjacent crystallites. In those cases, both Tg values lie within the abovementioned temperature ranges.

The semi-crystalline polyester resin preferably has a hydroxyl value of at least 15 mg KOH/g. This enables to ensure that it is able to be adequately cured. Most preferably the semi-crystalline polyester resin has a hydroxyl value of at least 20 mg KOH/g. It preferably has a hydroxyl value of not more than 70 mg KOH/g, most preferably not more than 40 mg KOH/g. In particular, the hydroxyl value may be from 15 to 20 mg KOH/g, or from 20 to 25 mg KOH/g, or from 25 to 30 mg KOH/g, or from 30 to 35 mg KOH/g, or from 35 to 40 mg KOH/g, or from 40 to 50 mg KOH/g, or from 50 to 60 mg KOH/g, or from 60 to 70 mg KOH/g. The hydroxyl value may be measured according to DIN 53240-2.

Preferably also, the semi-crystalline polyester resin has an acid value of no more than 10 mg KOH/g, more especially no more than 5 mg KOH/g. The acid value may be measured according to ASTM D-1639-90.

A semi-crystalline polyester resin with such a hydroxyl value and an acid value may be prepared by a polycondensation reaction of polyols with poly-carboxylic acids (or anhydrides, esters, or acid chlorides based on these acids) using an excess of alcohol over acid.

In alternative and less preferred embodiments, the semi-crystalline polyester resin has an acid value of at least 15 mg KOH/g per gram, most preferably of at least 20 mg KOH/g. It may have an acid value of not more than 70 mg KOH/g, most preferably not more than 40 mg KOH/g. For example, it may have an acid value of from 15 to 20 mg KOH/g, or from 20 to 30 mg KOH/g, or from 30 to 40 mg KOH/g, or from 40 to 55 mg KOH/g, or from 55 to 70 mg KOH/g. It may have a hydroxyl value of no more than 10 mg KOH/g, more especially no more than 5 mg KOH/g. A semi-crystalline polyester resin with such a hydroxyl value and an acid value may be prepared by a polycondensation reaction of polyols with poly-carboxylic acids (or anhydrides, esters, or acid chlorides based on these acids) using an excess of acid over alcohol.

A semi-crystalline polyester resin having a hydroxyl value of from 15 to 70 mg KOH/g and an acid value lower than 10 mg KOH/g will have a better compatibility with the fluoropolymer resin than a semi-crystalline polyester resin having a high acid value and a low hydroxyl value.

The number average molecular weight Mn of the semi-crystalline polyester resin is preferably at least 1500. With such a number average molecular weight, the semi-crystalline polyester resin can contribute to the toughness of the coating. Number average molecular weights Mn of at least 2000 are particularly preferred.

The Mn of the semi-crystalline polyester resin is preferably not more than 15000, most preferably not more than 5000. Number average molecular weights of up to 4000 should especially be mentioned. The number average molecular weight Mn may be measured by Gel Permeation Chromatography (GPC).

In some embodiments, the Mn of the semi-crystalline polyester resin is from 1500 to 2000, or from 2000 to 3000, or from 3000 to 4000, or from 4000 to 5000, or from 5000 to 6000, or from 6000 to 7000, or from 7000 to 8000, or from 8000 to 9000, or from 9000 to 10000, or from 10000 to 11000, or from 11000 to 12000, or from 12000 to 13000, or from 13000 to 14000, or from 14000 to 15000.

The semi-crystalline polyester resin may have a heat of fusion of from 20 to 100 J/g, preferably from 25 to 90 J/g. The heat of fusion may be determined by DSC according to ISO 11357-3:1999 but at a heating rate of 10° C./min. In examples, the heat of fusion may be of from 20 to 25 J/g, or from 25 to 30 J/g, or from 30 to 40 J/g, or from 40 to 50 J/g, or from 50 to 60 J/g, or from 60 to 70 J/g, or from 70 to 80 J/g, or from 80 to 90 J/g.

The semi-crystalline polyester resin may have melt viscosity of from 0.005 to 10 Pa·s at 165° C. and at a shear rate of 30 s$^{-1}$. In particular, the melt viscosity may be from 0.005 to 0.05 Pa·s, or from 0.05 to 0.5 Pa·s, or from 0.5 to 1 Pa·s, or from 1 to 2 Pa·s, or from 2 to 3 Pa·s, or from 3 to 4 Pa·s, or from 4 to 6 Pa·s, or from 6 to 8 Pa·s, or from 8 to 10 Pa·s at 165° C. and at a shear rate of 30 s$^{-1}$. The melt viscosity may be measured according to ASTM D-4287-00, at 165° C.

The semi-crystalline polyester resin may be prepared as described in DE 10 2006 057837.

Fluoropolymer Resin

The fluoropolymer resin may comprise within its backbone at least one unit from a monomer chosen among vinyl monomers containing at least one fluorine atom, vinyl monomers comprising at least one fluoroalkyl group and vinyl monomers comprising at least one fluoroalkoxy group. As an example, this monomer can be vinyl fluoride; vinylidene fluoride; trifluoroethylene (VF3); chlorotrifluoroethylene (CTFE); 1,2-difluoroethylene; tetrafluoroethylene (TFE); hexafluoropropylene (HFP); a perfluoro(alkyl vinyl) ether such as perfluoro(methyl vinyl)ether (PMVE), perfluoro(ethyl vinyl) ether (PEVE) or perfluoro(propyl vinyl) ether (PPVE); perfluoro(1,3-dioxole); perfluoro(2,2-diméthyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_m$ and m is 1, 2, 3 or 4; the product of formula $R_2OCF=CH_2$ in which $R_2$ is $F(CF_2)_p$ and p is 1, 2, 3 or 4; perfluorobutyl ethylene (PFBE); 3,3,3-trifluoropropene or 2-trifluoromethyl-3,3,3-trifluoro-1-propene.

The fluoropolymer resin can be a homopolymer or a copolymer.

Preferably, the fluoropolymer resin consists of units from one or more monomers chosen among the abovementioned monomers. Compared to fluoropolymer resins comprising units from non-fluorinated monomers, such a fluoropolymer resin may exhibit a better weatherability and thus may provide a better weatherability to the resin composition.

Alternatively, the fluoropolymer resin may also comprise units from non-fluorinated monomers like ethylene. Advantageously, the fluoropolymer resin is a polyvinylidene fluoride resin.

The polyvinylidene fluoride resin is preferably a homopolymer.

In other embodiments, the polyvinylidene fluoride resin may be a copolymer comprising, or consisting of, vinylidene fluoride units and units from one or more other monomers. Examples of other monomers are vinyl fluoride; trifluoroethylene; chlorotrifluoroethylene (CTFE); 1,2-difluoroethylene, tetrafluoroethylene (TFE); hexafluoropropylene (HFP); perfluoro(alkyl vinyl)ethers such as perfluoro(methyl vinyl)ether (PMVE), perfluoro(ethyl vinyl)ether (PEVE) or perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R'CH_2OCF=CF_2$ in which R' is hydrogen or $F(CF_2)_z$ and z is 1, 2, 3 or 4; the product of formula $R''OCF=CH_2$ in which R" is $F(CF_2)_z$ and z is 1, 2, 3 or 4; perfluorobutylethylene (PFBE); 3,3,3-trifluoropropene or 2-trifluoromethyl-3,3,3-trifluoro-1-propene. Hexafluoropropylene is preferred. The polyvinylidene fluoride copolymer may also comprise units from ethylene monomers. Preferably, when the polyvinylidene fluoride resin is a copolymer, it contains at least 50% by weight, more preferably at least 60% by weight, even more preferably at least 70% by weight, even more preferably at least 80% by weight, of vinylidene fluoride units.

The fluoropolymer resin may be a mixture of two or more of the abovementioned resins.

The fluoropolymer may have a viscosity measured by capillary rheometry according to ASTMD3835 at a shear rate of 100 s$^{-1}$ and at 230° C. lower than 3000 Pa·s and more preferably lower than 1500 Pa·s.

Advantageously, the fluoropolymer resin has a melting temperature higher than that of the semi-crystalline polyester resin.

Powder Coating Composition

In another aspect, the invention relates to a powder coating composition comprising the resin composition as described above, in a powdered form.

Preferably, the powder coating composition is a curable (or crosslinkable) powder coating composition.

The powder coating composition may comprise from 5 to 90% by weight, preferably from 10 to 90% by weight, more preferably from 40 to 90% by weight, more preferably from 60 to 90% by weight, more preferably from 70 to 80% by weight of fluoropolymer resin, based on the total weight of the powder coating composition.

The powder coating composition may comprise from 5 to 90% by weight, preferably from 10 to 90% by weight, more preferably from 10 to 60% by weight, more preferably from 10 to 40% by weight, more preferably from 20 to 30% by weight of semi-crystalline polyester resin, based on the total weight of the powder coating composition.

In preferred embodiments, the powder coating composition comprises a crosslinking agent. Preferably, the crosslinking agent is an isocyanate crosslinking agent, more preferably a polyisocyanate crosslinking agent, more preferably a blocked polyisocyanate crosslinking agent. However, other crosslinking agent may be mentioned, such as an amine crosslinking agent such as a melamine resin, a guanamine resin, a sulfonamide resin, a urea resin or an aniline resin, a β-hydroxyalkylamide crosslinking agent, or a triglycidyl isocyanurate crosslinking agent.

The cross-linking agent may be present in an amount of from 2 to 8% by weight, preferably of from 3 to 6% by weight, based on the total weight of the powder coating composition.

The powder coating composition may also comprise other additives, for example chosen among pigments, flow agents, degassing agents, waxes and combinations thereof. These other additives are preferably in an amount of from 10 to 30% by weight, preferably of from 20 to 25% by weight, based on the total weight of the powder coating composition. These additives are the usually known by the powder coating formulators, as described in the book "Coatings Formulation" by Bodo Müller, Ulrich Poth, 2nd Revised Edition, Hanover: Vincentz Network, 2011, European Coatings Tech Files, ISBN 978-3-86630-891-6.

In some embodiments, the powder coating composition essentially consists of, or consists of, the abovementioned components or of any combination of the abovementioned components.

Preparation Processes

In another aspect, the invention relates to a method for producing the above resin composition, comprising blending in a blender the fluoropolymer resin with the semi-crystalline polyester resin at a temperature higher than the melting temperature of the semi-crystalline polyester resin, the semi-crystalline polyester resin being in the molten state, to form a blend, which is preferably homogenous.

In this method, all features described above regarding the nature of the fluoropolymer resin and the semi-crystalline polyester resin, as well as their amounts in the blend in relation to the resin composition apply similarly.

By "homogeneous blend" is meant a blend which is macroscopically homogeneous, i.e. in which no phase separation is visible to the naked eye.

The blender is preferably an extruder or co-kneader, more preferably a twin-screw extruder or a co-kneader.

Preferably, the fluoropolymer resin and semi-crystalline polyester resin to be blended are in a powdered form.

Advantageously, the method further comprises a step of converting the blend into flakes, into pellets or into powder after cooling of the blend.

When the method comprises a step of converting the blend into powder, a powder resin composition is produced, which may be as described above. Preferably, the blend is first formed into a solid compound such as a flake or pellet and the solid compound is ground to powder. Any grinding technologies may be used to perform this step, for example a grinder using hammer mill, pin mill, attrition discs or an impact classifier mill.

The method may comprise a step of selecting powder particles having the desired granulometry, for example by passing the powder through a sieve.

In preferred embodiments, the fluoropolymer resin remains in the solid state without melting during the step of blending. In such embodiments, the blending step is carried out at a temperature higher than the melting temperature of the semi-crystalline polyester resin but lower than the melting temperature of the fluoropolymer resin. The fluoropolymer resin may be used as a powder, with a Dv50 advantageously between 1 and 50 μm, more preferably between 2 and 15 μm. This can improve the grinding ability of the compound formed after the blending step.

The blending step may comprise blending the fluoropolymer resin and the semi-crystalline polyester resin with also other components.

The invention also pertains to a resin composition or a powder resin composition produced according to the process described above.

In another aspect, the invention relates to a method for producing a powder coating composition as described above comprising mixing the powder coating composition components (i.e. the resin composition as described above and for example the crosslinking agent, the pigments, the flow agents, the degassing agents and/or the waxes).

The mixing step may be a step of dry-blending the components in a powdered form.

Alternatively, the mixing step may be a step of melt-bending part or all of the components. The blend is then ground to powder after solidification. When only a part of the components is melt-blended and ground to powder, the obtained particles are dry-blended with the rest of the components in a powdered form.

The mixing step may be performed in one or several steps, and the components may be mixed in any order.

The invention also pertains to a powder coating composition produced according to the process described above.

Applications

In another aspect, the invention relates to the use of the above resin composition, in a powdered form (i.e. the powder resin composition), in a powder coating composition. Said powder coating composition is preferably a crosslinkable powder coating composition.

Preferably, the resin composition or the powder coating composition is used for architectural powder coatings or for automotive paints.

Advantageously, said architectural powder coatings have a high weatherability. For example, the coating may exhibit a gloss retention higher than or equal to 80% after 500 h when measured according to ASTM D-523-60E.

The architectural powder coatings may last for more than 10 years.

In another aspect, the invention relates to a process for coating a substrate comprising:
- applying the above resin composition, in a powdered form (i.e. the powder resin composition), or the above powder coating composition onto the substrate;
- melting the powder resin composition or the powder coating composition.

The substrate may be wood, or a metal such as aluminum and steel grades.

Melting of the powder resin composition or the powder coating composition may be performed by heating the substrate covered with the powder at a temperature higher than the melting temperature of the powder, for example at a temperature of from 160° C. to 280° C. preferably from 180° C. to 250° C.

Preferably, the process for coating a substrate comprises a step of curing the powder resin composition or the powder coating composition applied on the substrate. This step may be performed simultaneously with the step of melting the powder resin composition or the powder coating composition. The curing may be induced by heating the powder resin composition or the powder coating composition, for example at a temperature of from 160° C. to 280° C. preferably from 180° C. to 250° C.

The coating of the substrate may be carried out by electrostatic spraying. In such a case, the process for coating a substrate may comprise the steps of:
- electrically charging the powder (the powder resin composition or the powder coating composition);
- spraying the electrically charged powder onto the substrate;
- heating the substrate covered with the powder at a temperature higher than the melting temperature of the powder.

In another aspect, the invention relates to a powder coating resulting from the use of at least one resin composition as described above.

The invention also relates to a powder coating obtained by applying and optionally curing at least one powder coating composition as described above.

The invention also relates to an object comprising the above powder coating.

EXAMPLES

The following examples illustrate the invention without limiting it.

Example 1

Compounds A to D were prepared as follows:
Compound A:
- a PVDF homopolymer, with a melting point of 169° C. and a melt viscosity of 6 kPo,
- a OH functional semi-crystalline polyester (polybutylene succinate) with OH functionality (or hydroxyl value) between 30-45 mg KOH/g, a melting point of 110° C., a heat of fusion of 20.9 J/g and a melt viscosity of <1 Pa·s,
- a crosslinker (Vestagon B-1530, Evonik), and
- a $TiO_2$ pigment (CR95, Ishihara)

were blended at a 52.5/19.6/2.9/25 weight ratio and at 140° C.;

Compound B:
- a PVDF homopolymer, with a melting point of 169° C. and a melt viscosity of 6 kPo,
- a OH functional semi-crystalline polyester (polybutylene succinate) with OH functionality between 30-45 mg KOH/g, a melting point of 110° C., a heat of fusion of 20.9 J/g and a melt viscosity of <1 Pa·s,
- a crosslinker (Vestagon B-1530, Evonik),
- benzoin, and
- a $TiO_2$ pigment (CR95, Ishihara)

were blended at a 53.2/19.7/3.1/1/23 weight ratio, at 110° C.

Compound C:
- a PVDF homopolymer, with a melting point of 169° C. and a melt viscosity of 6 kPo,
- a PVDF-HFP copolymer, with 17 wt. % HFP, a melting point of 115° C. and a viscosity of 3 kPo,
- a OH functional semi-crystalline polyester (polybutylene succinate) with OH functionality between 30-45 mg KOH/g, a melting point of 110° C., a heat of fusion of 20.9 J/g and a melt viscosity of <1 Pa·s measured by ISO 3129,
- a crosslinker (Vestagon B-1530, Evonik),
- benzoin, and
- a $TiO_2$ pigment (R960, Dow)

were blended at a 49.2/4/19.7/3.1/1/23 weight ratio, at 110° C.

Compound D:
- an amorphous polyester (Reafree 5700, Arkema Coating Resins) with acid functionality (or acid value) between 30-36 mg KOH/g, a glass transition temperature of 61° C., and a melt viscosity of 15 Pa·s measured by ASTM D4287 at 165° C.,
- a crosslinker (TGIC),
- benzoin, and
- a $TiO_2$ pigment (CR95, Ishihara)

were blended at a 70.7/5.3/1/23 weight ratio at 110° C.

Compound E:
- a PVDF homopolymer, with a melting point of 169° C. and a melt viscosity of 6 kPo,
- a OH functional amorphous polyester (Reafree 17014, Arkema Coating Resins) with OH functionality between 38-48 mg KOH/g, a glass transition temperature of 60° C., and a melt viscosity of 30 Pa·s measured by DIN 53229,
- a crosslinker (Vestagon B-1530, Evonik),
- benzoin, and
- a $TiO_2$ pigment (R960, Dow)

were blended at a 51.8/18.4/3.8/1/23 weight ratio, at 110° C.

Compound F:
- a PVDF homopolymer, with a melting point of 169° C. and a melt viscosity of 6 kPo,
- an amorphous polyester (Reafree 5700, Arkema Coating Resins) with acid functionality between 30-36 mg KOH/g, a glass transition temperature of 61° C., and a melt viscosity of 15 Pa·s measured by ASTM D4287 at 165° C.,
- a crosslinker (TGIC),
- benzoin, and a TiO₂ pigment (R960, Dow)
were blended at a 51.8/20.7/1.6/1/23 weight ratio, at 110° C.

Compound G:
- a PVDF homopolymer, with a melting point of 169° C. and a melt viscosity of 6 kPo,
- a PVDF-HFP copolymer, with 17 wt. % HFP, a melting point of 115° C. and a viscosity of 3 kPo,
- a OH functional semi-crystalline polyester (polybutylene succinate) with OH functionality between 30-45 mg KOH/g, a melting point of 110° C., a heat of fusion of 20.9 J/g and a melt viscosity of <1 Pa·s,
- a crosslinker (Vestagon B-1530, Evonik),
- a degassing agent (BYK3955P, BYK), and
- a TiO₂ pigment (R960, Dow)

were blended at a 46.3/5.8/20.3/2.9/2/22.8 weight ratio, at 110° C.

All compounds were each ground in a high speed blender and sieved with a 125 μm mesh. The sieved powder was electrostatically sprayed onto a chromated aluminum panel and baked at 220° C. for 15 min.

Coatings from compounds A to C and G are according to the invention, coating from compounds D to F is a comparative example.

Then, the coatings were assessed for the following properties:
- cross hatch adhesion, according to AAMA 2605-13 8.4.1.1;
- cross hatch adhesion with reverse impact, according to ASTM D3359-02;
- direct and reverse impact, according to AAMA 2605-13 A5.2.2;
- MEK solvent resistance, according to ASTM D4752 (200 double rub); this test enables to assess the resistance to solvents and cleaning chemicals;
- grinding ability, according to the following method: Grind 20 g of the material in a high speed blender like Ultra Centrifugal Mill ZM 200 by Retsch for 15 s; measure the weight of the material which passed the 125 μm opening sieve.
- weathering properties assessed by gloss retention after 500 h of QUV test according to ASTM D3451. If the gloss retention if higher than or equal to 80%, the coating is noted as "pass", if the gloss retention is lower than 80%, the coating is noted as "fail".

The results are given in the following table:

| Coating from compounds n° | A | B | C | D | E | F | G |
|---|---|---|---|---|---|---|---|
| Cross hatch adhesion | 100 | 100 | 100 | 100 | 100 | 100 | 100 |
| Cross hatch adhesion with reverse impact | 100 | 100 | 100 | 100 | 100 | 100 | 100 |
| Direct impact | Pass | Pass | Pass | Pass | Pass | Pass | Pass |
| Reverse impact | Pass | Pass | Pass | Pass | Pass | Pass | Pass |
| MEK solvent resistance | Pass | Pass | Pass | Pass | Pass | Fail | Pass |
| Grinding ability | OK | OK | OK | OK | OK | OK | OK |
| Weathering properties | Pass | Pass | Pass | Fail | Fail | Pass | Pass |

The invention claimed is:

1. A resin composition comprising a blend of:
   10 to 90% by weight of at least one fluoropolymer resin and
   90 to 10% by weight of at least one semi-crystalline polyester resin having a hydroxyl value of from 15 to 70 mg KOH/g and an acid value lower than 10 mg KOH/g,
   based on the total weight of the at least one fluoropolymer resin and at least one semi-crystalline polyester resin; and
   wherein the at least one fluoropolymer resin is a polyvinylidene fluoride homopolymer or a polyvinylidene fluoride copolymer comprising vinylidene fluoride units and units from one or more other monomers selected from the group consisting of vinyl fluoride, trifluoroethylene; chlorotrifluoroethylene, 1,2-difluoroethylene, tetrafluoroethylene, hexafluoropropylene, perfluoro(methyl viny) ether, perfluoro(ethyl viny) ether, perfluoro(propyl vinyl)ether, perfluoro(1,3-dioxole), perfluoro(2,2-dimethyl-1,3-dioxole), $CF_2=CFOCF_2CF(CF_3)OCF_2CF_2X$ in which X is $SO_2F$, $CO_2H$, $CH_2OH$, $CH_2OCN$ or $CH_2OPO_3H$; $CF_2=CFOCF_2CF_2SO_2F$, $F(CF_2)_nCH_2OCF=CF_2$ in which n is 1, 2, 3, 4 or 5, $R'CH_2OCF=CF_2$ in which R' is hydrogen or $F(CF_2)_z$ and z is 1, 2, 3 or 4, $R''OCF=CH_2$ in which R'' is $F(CF_2)_z$ and z is 1, 2, 3 or 4, perfluorobutylethylene, 3,3,3-trifluoropropene, and 2-trifluoromethyl-3,3,3-trifluoro-1-propene.

2. The resin composition of claim 1, wherein the at least one semi-crystalline polyester comprises units derived from:
   at least a poly-carboxylic acid chosen among a linear aliphatic dicarboxylic acid and/or a cycloaliphatic dicarboxylic acid, and
   at least a polyol chosen among a linear aliphatic diol and/or a cycloaliphatic diol.

3. The resin composition of claim 1, wherein the melting temperature of the at least one semi-crystalline polyester resin is from 75° to 150° C.

4. The resin composition of claim 1, wherein the glass transition temperature of the at least one semi-crystalline polyester resin is lower than 55° C., as determined by DSC at a heating rate of 10° C./min and/or wherein the at least one semi-crystalline polyester resin has a heat of fusion of from 20 to 100 J/g, as determined by DSC at a heating rate of 10° C./min.

5. The resin composition of claim 1, wherein the at least one semi-crystalline polyester resin comprises a hydroxyl value of from 20 to 40 mg KOH/g and an acid value lower than 5 mg KOH/g.

6. The resin composition of claim 1, wherein the number average molecular weight Mn of the at least one semi-crystalline polyester is from 1500 to 15000 and/or wherein the at least one semi-crystalline polyester resin has a melt viscosity of from 0.005 to 10 Pa·s at 165° C. and at a shear rate of 30 s$^{-1}$.

7. The resin composition of claim 1, comprising from 60 to 90% by weight of said at least one fluoropolymer resin and from 10 to 40% by weight of said at least one semi-crystalline polyester resin, based on the total weight of the at least one fluoropolymer resin and at least one semi-crystalline polyester resin.

8. The resin composition of claim 1, wherein the at least one fluoropolymer resin comprises polyvinylidene fluoride homopolymers or poly(vinylidene fluoride-hexafluoropropylene) copolymers.

9. The resin composition of claim 1, wherein the at least one fluoropolymer resin has a melting temperature higher than that of the at least one semi-crystalline polyester resin.

10. The resin composition of claim 1, wherein the resin composition comprises a form selected from the group consisting of flakes, pellets, and powder.

11. A method for producing the resin composition of claim 1, comprising:
blending in a blender, the at least one fluoropolymer resin with the at least one semi-crystalline polyester resin, at a temperature higher than the melting point of the at least one semi-crystalline polyester resin, the at least one semi-crystalline polyester resin being in the molten state, to form a blend.

12. The method of claim 11, wherein the at least one fluoropolymer resin remains in the solid state without melting during the step of blending.

13. A powder coating composition, comprising at least one resin composition as defined according to claim 10 and further comprising a crosslinking agent.

14. A powder coating obtained by applying and curing the powder coating composition of claim 13.

15. The resin composition of claim 1, wherein the at least one semi-crystalline polyester resin has a linear aliphatic or/and cycloaliphatic structure.

16. The resin composition of claim 2, wherein the polycarboxylic acid is a linear aliphatic $C_4$-$C_8$ dicarboxylic acid and/or a cycloaliphatic dicarboxylic acid.

17. The resin composition of claim 2, wherein the polyol is chosen among a linear aliphatic $C_2$-$C_8$ diol and/or a cycloaliphatic diol.

18. The resin composition of claim 2, wherein the polycarboxylic acid is selected from the group consisting of adipic acid, succinic acid, 1,5-pentanedioic acid, 1,4-cyclohexanedicarboxylic acid and a combination thereof.

19. The resin composition of claim 2, wherein the polyol is selected from the group consisting of 1,6-hexanediol, 1,4-butanediol, 1,4-cyclohexanedimethanol and a combination thereof.

20. The resin composition of claim 10, in the form of a powder having a particle volume median diameter Dv50 of from 10 to 250 μm, as determined by laser granulometry.

* * * * *

UNITED STATES PATENT AND TRADEMARK OFFICE
CERTIFICATE OF CORRECTION

PATENT NO. : 12,091,576 B2
APPLICATION NO. : 17/309761
DATED : September 17, 2024
INVENTOR(S) : Fukuyama et al.

It is certified that error appears in the above-identified patent and that said Letters Patent is hereby corrected as shown below:

In the Specification

In Column 2, Line 14, delete "acid, succinic" and insert --succinic acid,--.

In Column 3, Line 65, delete "calorimetry" and insert --Calorimetry--.

In the Claims

In Column 14, Claim 1, Line 14 (Approx.), delete "trifluoroethylene;" and insert --trifluoroethylene,--.

Signed and Sealed this
Twenty-sixth Day of November, 2024

Katherine Kelly Vidal
*Director of the United States Patent and Trademark Office*